(12) United States Patent
Sen et al.

(10) Patent No.: US 10,330,772 B2
(45) Date of Patent: Jun. 25, 2019

(54) DETERMINING A LOCATION OF A DEVICE

(71) Applicant: Hewlett Packard Enterprise Development LP, Houston, TX (US)

(72) Inventors: Souvik Sen, Mountain View, CA (US); Dongho Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 231 days.

(21) Appl. No.: 15/500,337

(22) PCT Filed: Nov. 14, 2014

(86) PCT No.: PCT/US2014/065819
§ 371 (c)(1),
(2) Date: Jan. 30, 2017

(87) PCT Pub. No.: WO2016/076893
PCT Pub. Date: May 19, 2016

(65) Prior Publication Data
US 2017/0212212 A1 Jul. 27, 2017

(51) Int. Cl.
*H04W 24/00* (2009.01)
*G01S 5/14* (2006.01)
(Continued)

(52) U.S. Cl.
CPC ............... *G01S 5/14* (2013.01); *G01S 5/021* (2013.01); *G01S 5/0268* (2013.01); *G01S 5/10* (2013.01);
(Continued)

(58) Field of Classification Search
CPC .. G01S 5/0252; H04L 29/08657; H04W 4/02; H04W 4/024; H04W 4/029; H04W 64/00
See application file for complete search history.

(56) References Cited

U.S. PATENT DOCUMENTS 8,050,630 B1 * 11/2011 Arbuckle ............... G01S 19/23
342/357.62
8,102,784 B1 * 1/2012 Lemkin ................. G01S 5/0289
370/252
(Continued)

FOREIGN PATENT DOCUMENTS

EP 2746802 A1 6/2014
WO 02/33435 A2 4/2002

OTHER PUBLICATIONS

Saha, S. et al, "Location Determination of a Mobile Device Using IEEE 802.11b Access Point Signals", Jul. 31, 2001.
(Continued)

*Primary Examiner* — Shantell L Heiber
(74) *Attorney, Agent, or Firm* — Hewlett Packard Enterprise Patent Department

(57) ABSTRACT

Described herein are techniques for determining a location of a device. In an example, a group of access points may be selected. Time-of-flight (ToF) measurements relative to the device may be received from each of the access points in the group. A respective distance of the device from each access point may be determined using the ToF measurements and a baseToF value. Location coordinates of the device and a new baseToF value may be determined based on the determined distances and the location coordinates of each access point in the group.

13 Claims, 3 Drawing Sheets

(51) Int. Cl.
*G01S 5/02* (2010.01)
*H04W 64/00* (2009.01)
*G01S 5/10* (2006.01)
*G01S 13/74* (2006.01)

(52) U.S. Cl.
CPC ............. *G01S 13/74* (2013.01); *H04W 64/00* (2013.01); *H04W 64/003* (2013.01)

(56) References Cited

U.S. PATENT DOCUMENTS

| | | | |
|---|---|---|---|
| 8,103,228 B2* | 1/2012 | Monat | G01S 7/285 |
| | | | 455/130 |
| 8,243,626 B2 | 8/2012 | Hall et al. | |
| 8,737,279 B1 | 5/2014 | Aweya et al. | |
| 8,826,344 B1* | 9/2014 | Gavade | H04N 21/47217 |
| | | | 725/88 |
| 2007/0225016 A1* | 9/2007 | Jendbro | G01S 19/05 |
| | | | 455/456.1 |
| 2009/0264137 A1 | 10/2009 | Soliman | |
| 2009/0325605 A1* | 12/2009 | Cha | G01S 5/0221 |
| | | | 455/456.2 |
| 2010/0135178 A1* | 6/2010 | Aggarwal | G01S 5/0205 |
| | | | 370/252 |
| 2010/0150117 A1* | 6/2010 | Aweya | G01S 5/14 |
| | | | 370/338 |
| 2011/0090122 A1 | 4/2011 | Thomson et al. | |
| 2011/0146371 A1 | 6/2011 | Roy et al. | |
| 2013/0143595 A1 | 6/2013 | Moshfeghi | |
| 2013/0260781 A1 | 10/2013 | Un et al. | |
| 2013/0294266 A1 | 11/2013 | Lim et al. | |
| 2014/0057655 A1 | 2/2014 | Lee | |
| 2014/0154996 A1 | 6/2014 | Banin et al. | |
| 2014/0185520 A1* | 7/2014 | Gao | H04W 64/00 |
| | | | 370/328 |
| 2014/0187200 A1 | 7/2014 | Reitter et al. | |
| 2015/0045022 A1* | 2/2015 | Prechner | G01S 5/0205 |
| | | | 455/434 |

OTHER PUBLICATIONS

Schauer, L et al, "Potentials and Limitations of WiFi-positioning Using Time-of-Flight", Oct. 28-31, 2013.
Wikipedia, "Point in polygon", (web page), available online at <https://en.wikipedia.org/w/index.php?title=Point_in_polygon&oldid=751899615>, Nov. 28, 2016, 4 pages.
International Search Report and Written Opinion received for PCT Patent Application No. PCT/US2014/065819, dated Jul. 15, 2015, 11 pages.
International Preliminary Report on Patentability received for PCT Patent Application No. PCT/US2014/065819, dated May 26, 2017, 10 pages.
Giustiniano et al., "CAESAR: carrier sense-based ranging in off-the-shelf 802.11 wireless LAN", CoNEXT '11 Proceedings of the Seventh COnference on emerging Networking EXperiments and Technologies, 2011, 12 pages.
European Search Report and Search Opinion Received for EP Application No. 14905707.7, dated Apr. 9, 2018, 8 pages.
Ermel et al., "On Selecting Nodes to Improve Estimated Positions", Belding-Royer et al. (eds) Mobile and Wireless Communication Networks, MWCN 2004, IFIP International Federation for Information Processing, vol. 162, 2005, 5 pages.

* cited by examiner

DETERMINING A LOCATION OF A DEVICE

BACKGROUND

Location determination systems can estimate a location of a device using various techniques. For example, some location determination systems use time-of-flight measurements of WiFi-capable devices to estimate a distance of a device from a wireless access point. If there are time-of-flight measurements available from multiple access points, a technique such as multilateration may be used to estimate the location of the device. Time-of-flight-based location determination systems have the advantage of being able to determine the location of a device in an indoor environment, where GPS signals may be blocked, for example, Improving the accuracy of location determination systems may be advantageous to provide more actionable data, such as for targeted advertisements in a retail store or mall.

BRIEF DESCRIPTION OF DRAWINGS

The following detailed description refers to the drawings, wherein.

DETAILED DESCRIPTION

To improve the accuracy of a time-of-flight-based location determination system, it is helpful to have an accurate mapping between distance and time-of-flight (ToF). That is, it is helpful to know how a particular time-of-flight value measured between an access point and a device corresponds to an actual distance between the access point and the device. A challenge is that the mapping between distance and time-of-flight can differ depending on the particular device involved. This can be due to the type of wireless card chipset employed by the device, which may result in different delays in packet reception, processing, and transmission. The differing delays caused by the chipsets can result in differing time-of-flights measured by an access point for two different devices (e.g., Samsung® Galaxy Note vs. Apple® iPhone) located at the same location. Because the time-of-flight measurements differ, the determined distance of each device from the access point may differ, which ultimately may result in the location determination system determining a different estimated location of each device even though they are in the same location.

It is possible to manually measure such delays for each unique device available on the market. However, such manual measurement would be a very burdensome and unwieldy task due to the large number of unique device, would require constant updates to the location determination system, and would require continued, indefinite manual intervention as new devices are constantly entering the market. Additionally, in operation, it may not be feasible or even possible for a ToF-based location determination system to determine a device type from an 802.11 probe response frame received from the device, which would make the manual measurement data useless since it could not be applied to the device.

In an example, a method is provided to determine a location of a device. In addition to determining the location of the device, the method may determine an estimate of the delay caused by the device's chipset. This estimated delay is referred to hereinafter as the "baseToF value". As the method is iteratively performed to determine the location of the device and baseToF value at later times, the previously determined baseToF value may be used in the calculations to determine the location of the device. As a result, the location determination system may determine the location of the device with more accuracy. Moreover, using these techniques the location determination system may improve the accuracy for any device, regardless of manufacturer, chipset, or newness of the device to the market. Furthermore, these techniques do not require manual measurement of baseToF values or constant updates to the location determination system. Additional examples, advantages, features, modifications and the like are described below with reference to the drawings.

Figure 1:
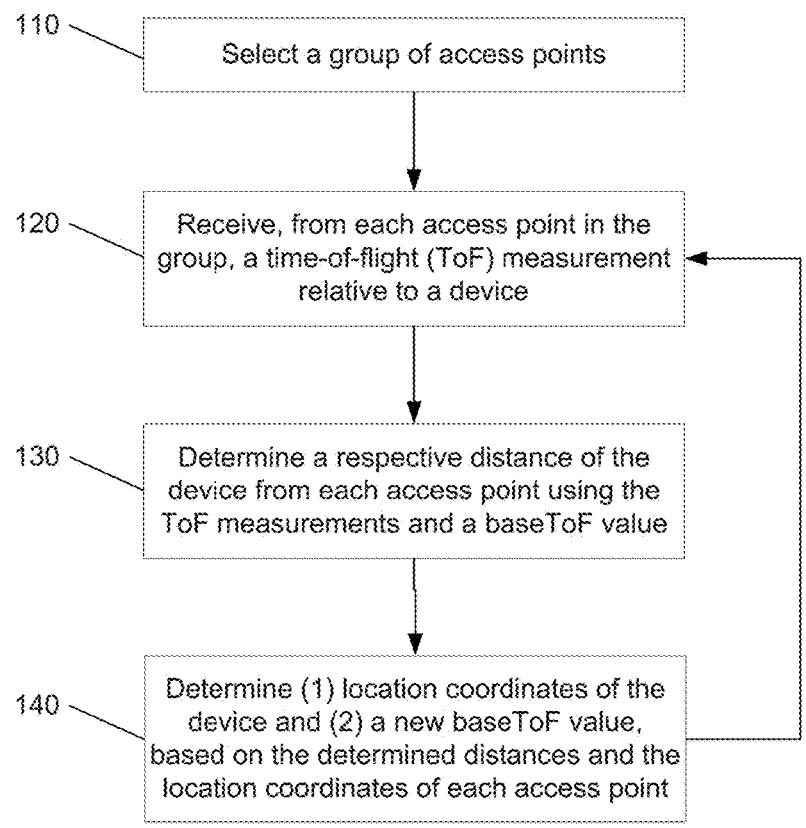
FIG. 1 illustrates a method to determine a location of a device, according to an example.

FIG. 1 illustrates a method to determine a location of a device, according to an example. Method 100 may be performed by a computing device or computer, such as controller system 210, and computer 310. Computer-readable instructions for implementing method 100 may be stored on a computer readable storage medium. These instructions as stored on the medium are referred to herein as "modules" and may be executed by a computer.

Figure 2:
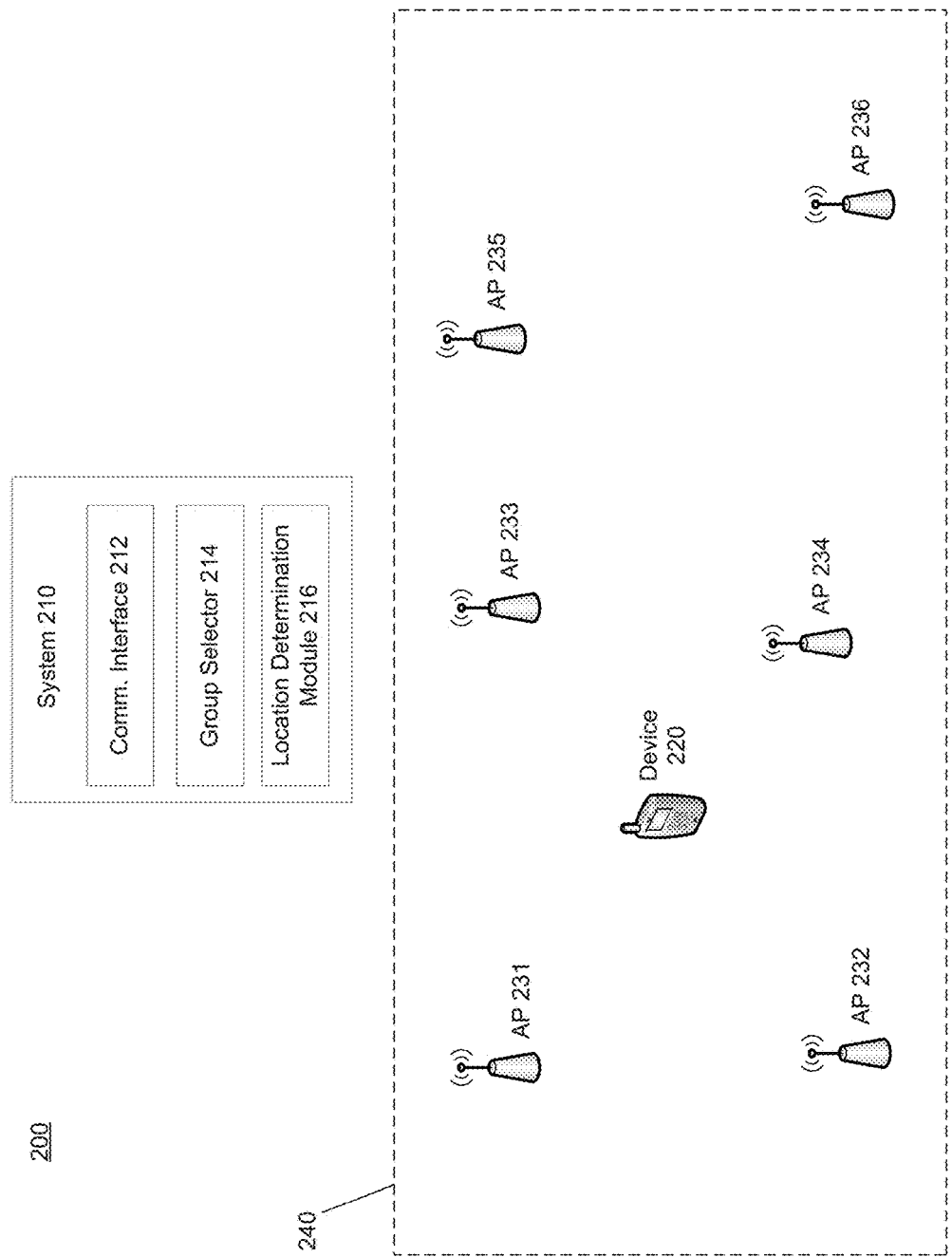
FIG. 2 illustrates a system to determine a location of a device, according to an example.

Method 100 will be described here relative to environment 200 of FIG. 2. Environment 200 may include a system 210, a device 220, and various access points (APs) 231-236. The access points may be located within an area 240, which may be an indoor area, such as a store, mall, office, etc., or an outdoor area, such as a park, city block, etc. Device 220 may be a mobile device, such as a mobile phone, smartphone, tablet computer, laptop computer, or the like, and may include wireless access capability, such as through a wireless card. System 210 may be a location determination system and may be implemented by any number of device, computers, or the like. System 210 may include a communication interface 212 for communicating with APs 231-236, a group selector 214, and a location determination module 216. System 210 may be configured to perform method 100, or aspects thereof, and/or instructions 332-336 of FIG. 3. APs 231-236 may be wireless access points that provide wireless network access to devices. The APs may implement known wireless networking protocols, such as IEEE 802.11 variations.

System 210, device 220, and APs 231-236 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 210, device 220, and APs 231-236 may include one or more machine-readable storage media separate from the one or more controllers.

Turning to FIG. 1, method 100 may be used to determine a location of a device, according to an example. For illustration, method 100 will be described as executed by system 210. A brief overview of time-of-flight and multilateration will now be provided before describing method 100.

In general, time-of-flight (ToF) of a wireless packet is the time which it takes for a wireless packet to travel for a given distance. A WiFi-based positioning system can use ToF between a mobile device and an access point (AP) to estimate a distance between the device and the AP. When a positioning system has estimated distances between a device and at least three APs, the system can decide a coordinate (x,y) of the device by a multilateration technique. For example, using ToF measurements from APs 231, 232, and 233, an estimated location of device 220 could be determined using multilateration. To gather ToF measurements, each AP transmits a probe packet (e.g., implemented by a WiFi-compliant (i.e., 802.11) NULL packet) to a mobile device. In response to the probe packet, device 220 sends back an acknowledgement (ACK) packet to the AP within SIFS (Short Interframe Space). SIFS is defined in the WiFi standard. The AP records when it transmits the probe packet (Time-of-Departure) and when it receives the corresponding ACK packet (Time-of-Arrival). With these measurements, ToF can be calculated as follows:

$$\text{ToF}=(\text{ToA}-\text{ToD}-\text{SIFS})/2. \quad \text{(Eq. 1)}$$

Each AP sends its ToF measurement to system 210. When system 210 receives a ToF measurement from an AP, it estimates a distance between the device and the AP as follows:

$$d_n=(\text{ToF}-\text{baseToF})*c, \quad \text{(Eq. 2)}$$

where $d_n$ is a distance between a device and $AP_n$, baseToF represents the ToF when a device is very close to an AP and essentially corresponds to the delay in packet reception, processing, and transmission caused by the device's chipset, and c is a constant representing the speed of light. After system 210 calculates distances between the device and multiple APs, it calculates coordinates (<Lx,Ly>) of the device by a multilateration technique.

Multilateration is briefly explained here. If it is assumed that each estimated distance $d_n$ has no error, the following equation for determining distance from an AP holds for each $AP_n$:

$$d_n=\|<AP_{n,x},AP_{n,y}>-<L_x,L_y>\| \quad \text{(Eq. 3)}$$

where $AP_{n,x}$ and $AP_{n,y}$ are x and y coordinates of $AP_n$ and $\|\cdot\|$ is the distance between two coordinates. With ToF measurements and location coordinates from three APs, a 2D coordinate <Lx,Ly> may be obtained by solving a system of linear equations, where the system includes the equation above for each of the three APs. However, since the estimated distance is known to have some error due to noise in the ToF measurement, these equations do not hold. Thus, instead of solving a system of linear equations, a multilateration technique can be used to obtain an estimated location <$EL_x$, $EL_y$> such that the sum of $\| \|<AP_{n,x},AP_{n,y}>-<EL_x,EL_y>\|-d_n\|$ is minimized. One example of such an estimation technique is the Gauss-Newton algorithm.

As discussed previously, for a location determination system (e.g., system 210) to generate an accurate estimation of a distance between a device and an AP, an accurate baseToF value should be used. This baseToF value can depend on the specific type of the device, due to the effect of different chipsets in the device which may cause different delays in packet reception, processing, and transmission. Described herein is a method to determine the location of a device while estimating the baseToF value for that device, which may enable more accurate location determinations in subsequent calculations. To achieve this, it is assumed that there is an unknown error in the distance and location calculations, which is inducted due to lack of knowledge of the actual baseToF value for the device. This unknown error is considered as an additional variable when determining the location of the device using a multilateration technique. To account for this additional unknown variable, which is a constant unknown variable across all the ToF measurements for a device, measurements from at least one additional AP (e.g., four APs instead of just three APs) are used so that an additional equation can be added to the system of equations. This system of at least four equations may then be solved using the Gauss-Newton algorithm.

Method 100 may begin at 110, where system 210 may select a group of access points. The group of access points may include four access points and may be selected from a larger group of more than four access points. The group of access points may be selected such that the selected access points form a convex quadrilateral around device 220. In order to make this determination, system 210 should have the location coordinates of the access points themselves as well as location coordinates of the device 220. The location coordinates of the device 220 may be previously determined estimated location coordinates of the device. For example, before performing method 100, system 210 may use ToF measurements from APs 231-236 relative to device 220 to initially estimate a location of device 220.

As an example, in area 240 there are six APs, APs 231-236. System 210 may have the location coordinates of these APs stored in memory. System 210 may also have estimated the location of device 220 using multilateration based on an initial set of ToF measurements from APs 231-236. With this information, system 210 can select a group of four APs that forms a convex quadrilateral around device 220. For example, the group selector 214 may select the group of APs. Group selector 214 may make this determination using a geometry technique such as "point in polygon". Thus, for example, group selector 214 determines that the convex quadrilateral formed by APs 233, 234, 235, and 236 does not surround device 220, and thus this group of APs will not be selected. However, group selector 214 also determines that there are multiple AP convex quadrilaterals surrounding device 220. For example, APs 231, 232, 233, and 234 form one such quadrilateral. Additionally, APs 231, 232, 235, and 236 form another such quadrilateral. There are others as well, such as the quadrilateral formed by APs 231, 232, 234, and 235. Where there are multiple convex quadrilaterals surrounding device 220, group selector 214 can select the convex quadrilateral that is determined to be the smallest. Such a determination of smallness may be made based on the area occupied by the quadrilateral being the smallest, as determined based on the APs' location coordinates. It may also be determined based on the sum of distances between device 220 and the APs in the group being the smallest. Here, using the smallest area technique, group selector 214 selects AP 231, 232, 233, and 234 for the group of access points.

At 120, system 210 may receive, from each access point in the group, a ToF measurement relative to device 220. For example, system 210 and/or a wireless controller may instruct the APs 231, 232, 233, and 234 in the group to gather ToF data for device 220. In response, the APs in the group may send probe packets to device 220, receive responses (e.g., ACKs) from device 220, and calculate the ToF as previously described. The APs can send these measurements to system 210, which may be received via communication interface 212.

At 130, system 210 may determine a respective distance of the device 220 from each access point in the group. The respective distances may be determined using the ToF measurements and a baseToF value. For example, location determination module 216 may calculate these distances using Eq. 2 above. The baseToF value may be a default value, such as if this is the first iteration of method 100. As examples, the default value may be zero, may be an average baseToF value for devices in general, or may be a minimum baseToF value (e.g., it may be determined that every device at least has a delay of x milliseconds, which may be used as the baseToF). Additionally, as discussed later, the baseToF value may also be a previously determined baseToF value, such as in the case where method 100 is performed multiple times. In such a case, the baseToF value can be refined each iteration using these techniques, resulting in a more accurate baseToF value.

At 140, system 210 may determine location coordinates of the device 220 as well as a new baseToF value. These may be determined using the distances determined in 130 and the location coordinates of each access point. For example, location determination module 216 may determine the location coordinates of device 220 and the new baseToF value for device 220 by solving a system of four equations, such as using the Gauss-Newton algorithm. In particular, a system of four equations may be set up as follows:

$$m_1 - e = \|<AP_{1_x}, AP_{1_y}> - <L_x, L_y>\|$$

$$m_2 - e = \|<AP_{2_x}, AP_{2_y}> - <L_x, L_y>\|$$

$$m_3 - e = \|<AP_{3_x}, AP_{3_y}> - <L_x, L_y>\|$$

$$m_4 - e = \|<AP_{4_x}, AP_{4_y}> - <L_x, L_y>\|$$

where $m_n$ is the determined respective distance of the device 220 from $AP_n$, e is the error value proportional to the difference between the new baseToF value and the baseToF value, $<AP_{n_x}, AP_{n_y}>$ are the location coordinates of $AP_n$, and $<L_x, L_y>$ are the location coordinates of the device.

Location determination module 216 may determine the location coordinates $<Lx, Ly>$ of device 220 and the new baseToF value by solving the system of equations for Lx, Ly, and e, which are the only unknown variables in the system of equations. The new baseToF value may then be determined using the following equation:

$$\text{new } baseToF = \text{previous } baseToF + \frac{e}{c}$$

where new baseToF is the new baseToF value, previous baseToF is the previous baseToF value (which may be the default baseToF value if this is the first iteration), e is the error value, and c is a constant representing the speed of light.

System 210 may repeat method 100 to iteratively determine new location coordinates of device 220 and additional new baseToF values based on newly received ToF measurements. In each successive iteration, the baseToF value determined in the immediately preceding iteration may be used as the current baseToF. As a result, the accuracy of the estimated location coordinates of device 220 and the new baseToF value may increase from iteration to iteration. At some point a stable baseToF value may eventually be arrived at.

Because system 210 has the estimated location of device 220, block 110 of method 100 may be skipped in some successive iterations of method 100 as the smallest convex quadrilateral surrounding the device 220 may not change for a period of time. This is because the group of APs and system 210 may be configured to regularly (e.g., once every n milliseconds) determine the location of device 220 such that device 220 does not move very much between successive iterations. In such a case, block 110 of method 100 may be skipped. However, if system 210 determines based on the current estimated location coordinates of device 220 that the current group of APs may not form the smallest convex quadrilateral around device 220 or that the current group of APs no longer forms a convex quadrilateral around device 220, system 210 may perform block 110 of method 100 to select a new group of access points. Such selection may be performed as described above to select a new group of APs forming the smallest convex quadrilateral around device 220. For example, if device 220 moves in the direction of APs 235 and 236, eventually APs 231, 232, 233, 234 will not form a convex quadrilateral around device 220. In such a case, a new group of APs including APs 233, 234, 235, 236 may be selected, for example.

Figure 3:
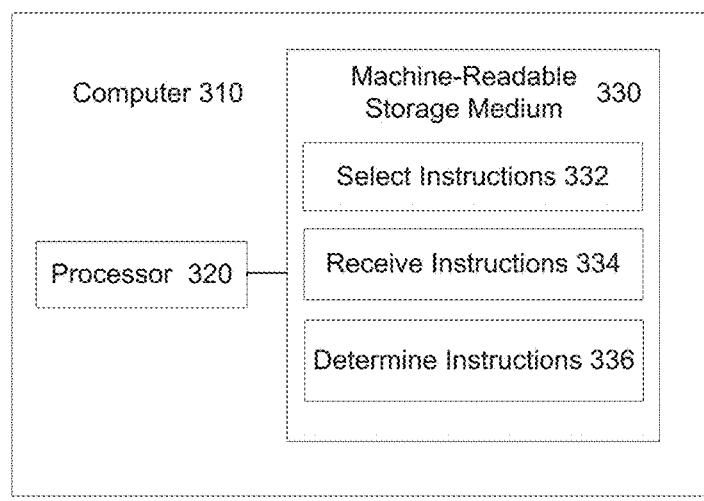
FIG. 3 illustrates a computer-readable medium to determine a location of a device, according to an example.

FIG. 3 illustrates a computer-readable medium to determine a location of a device, according to an example. Computer 310 may be part of system 210. The computer may include one or more controllers and one or more machine-readable storage media, as described with respect to system 210, for example.

Processor 320 may be at least one central processing unit (CPU), at least one semiconductor-based microprocessor, other hardware devices or processing elements suitable to retrieve and execute instructions stored in machine-readable storage medium 330, or combinations thereof. Processor 320 can include single or multiple cores on a chip, multiple cores across multiple chips, multiple cores across multiple devices, or combinations thereof. Processor 320 may fetch, decode, and execute instructions 332-336 among others, to implement various processing. As an alternative or in addition to retrieving and executing instructions, processor 320 may include at least one integrated circuit (IC), other control logic, other electronic circuits, or combinations thereof that include a number of electronic components for performing the functionality of instructions 332-336. Accordingly, processor 320 may be implemented across multiple processing units and instructions 332-336 may be implemented by different processing units in different areas of computer 310.

Machine-readable storage medium 330 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 330 can be computer-readable and non-transitory. Machine-readable storage medium 330 may be encoded with a series of executable instructions for managing processing elements.

The instructions 332-336 when executed by processor 320 (e.g., via one processing element or multiple processing elements of the processor) can cause processor 320 to perform processes, for example, method 100, and/or variations and portions thereof. Instructions 332-336 will now be briefly described, which description should be read in light of the description of method 100 and system 210 above.

For example, select instructions 332 may cause processor 320 to select a group of four access points that form a convex quadrilateral around a device. Receive instructions 334 may cause processor 320 to receive, from each access point in the group, a ToF measurement relative to the device. Determine instructions 336 may cause processor 320 to determine a respective distance of the device from each access point in the group using the ToF measurements and a baseToF value. Determine instructions 336 may additionally cause processor 320 to determine (1) location coordinates of the device and (2) a new baseToF value. These may be determined based on the determined distances and the location coordinates of each access point in the group.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method for determining a location of a device, comprising, by a processor:
   selecting a group of access points;
   receiving, from each access point in the group, a time-of-flight (ToF) measurement relative to the device;
   determining a respective distance of the device from each access point in the group using the ToF measurements and a baseToF value; and
   determining (1) location coordinates of the device and (2) a new baseToF value, based on the determined distances and the location coordinates of each access point in the group, wherein the location coordinates of the device and the new baseToF value are determined by solving a system of equations, the system of equations including an equation for each access point n ($AP_n$) as follows:

$$m_n - e = \|\langle AP_{n,x}, AP_{n,y}\rangle - \langle L_x, L_y\rangle\|$$

where $m_n$ is the determined respective distance of the device from $AP_n$, e is the error value proportional to the difference between the new baseToF value and the baseToF value, $\langle AP_{n,x}, AP_{n,y}\rangle$ are the location coordinates of $AP_n$, and $\langle L_x, L_y\rangle$ are the location coordinates of the device.

2. The method of claim 1, wherein the selected group of access points comprises four access points, and wherein the group of access points are selected from a larger group of more than four access points.

3. The method of claim 2, wherein the group of access points are selected because they are determined to form a convex quadrilateral around the device based on the location coordinates of the access points and previously determined location coordinates of the device.

4. The method of claim 3, wherein the group of four access points are selected over a second group of four access points that are determined to form a second convex quadrilateral around the device because the convex quadrilateral formed by the group of access points is determined to be smaller than the second convex quadrilateral.

5. The method of claim 1, wherein the baseToF value is a default value.

6. The method of claim 1, wherein the baseToF value is a previously determined new baseToF value from a previous iteration.

7. The method of claim 1, wherein the respective distance of the device from each access point in the group is determined for each access point n ($AP_n$) as follows:

$$m_n = (ToF_n - baseToF) * c$$

where $m_n$ is the determined respective distance of the device from $AP_n$, $ToF_n$ is the ToF measurement from the device to $AP_n$, and c is a constant representing the speed of light.

8. The method of claim 1, comprising:
   receiving, from each access point in the group, a second ToF measurement relative to the device;
   determining a second respective distance of the device from each access point in the group using the second ToF measurements and the new baseToF value; and
   determining (1) second location coordinates of the device and (2) a second new baseToF value, based on the determined second distances and the location coordinates of each access point in the group.

9. The method of claim 8, comprising:
   based on the second location coordinates of the device, selecting a new group of access points that are determined to form a convex quadrilateral around the device;
   receiving, from each access point in the new group, a third ToF measurement relative to the device;
   determining a third respective distance of the device from each access point in the new group using the third ToF measurements and the second new baseToF value; and
   determining (1) third location coordinates of the device and (2) a third new baseToF value, based on the determined third distances and the location coordinates of each access point in the new group.

10. A location determination system for determining a location of a device, comprising:
    a group selector to select a group of access points;
    a communication interface to receive, from each access point in the group, a time-of-flight (ToF) measurement relative to the device; and
    a location determination module to determine:
       a respective distance of the device from each access point in the group using the ToF measurements and a baseToF value; and
       location coordinates of the device and a new baseToF value, based on the determined distances and the location coordinates of each access point in the group, wherein the location coordinates of the device and the new baseToF value are determined by solving a system of equations, the system of equations including an equation for each access point n ($AP_n$) as follows:

$$m_n - e = \|\langle AP_{n,x}, AP_{n,y}\rangle - \langle L_x, L_y\rangle\|$$

where $m_n$ is the determined respective distance of the device from $AP_n$, e is the error value proportional to the difference between the new baseToF value and the baseToF value, $\langle AP_{n,x}, AP_{n,y}\rangle$ are the location coordinates of $AP_n$, and $\langle L_x, L_y\rangle$ are the location coordinates of the device.

11. The location determination system of claim 10, wherein the group selector is to select the group of access points from a larger group of access points based on a determination that the group of access points form a smallest convex quadrilateral around the device.

12. The location determination system of claim 10, wherein the system is configured to iteratively determine new location coordinates of the device and additional new baseToF values based on newly received ToF measurements.

13. A non-transitory computer-readable storage medium storing instructions that, when executed by a processor, cause the processor to:

select a group of four access points that form a convex quadrilateral around a device;

receive, from each access point in the group, a time-of-flight (ToF) measurement relative to the device;

determine a respective distance of the device from each access point in the group using the ToF measurements and a baseToF value; and determine (1) location coordinates of the device and (2) a new baseToF value, based on the determined distances and the location coordinates of each access point in the group, wherein the location coordinates of the device and the new baseToF value are determined by solving a system of equations, the system of equations including an equation for each access point n ($AP_n$) as follows:

$$m_n - e = \|\langle AP_{n,x}, AP_{n,y}\rangle - \langle L_x, L_y\rangle\|$$

where $m_n$ is the determined respective distance of the device from $AP_n$, e is the error value proportional to the difference between the new baseToF value and the baseToF value, $\langle AP_{n,x}, AP_{n,y}\rangle$ are the location coordinates of $AP_n$, and $\langle L_x, L_y\rangle$ are the location coordinates of the device.

* * * * *